F. W. MUELLER.
INCUBATOR.
APPLICATION FILED JUNE 5, 1919.

1,344,591.

Patented June 22, 1920.

Inventor:
F. William Mueller.

UNITED STATES PATENT OFFICE.

FRED WILLIAM MUELLER, OF CALIFORNIA, MISSOURI.

INCUBATOR.

1,344,591.      Specification of Letters Patent.      Patented June 22, 1920.

Application filed June 5, 1919. Serial No. 302,079.

*To all whom it may concern:*

Be it known that I, FRED WILLIAM MUELLER, a citizen of the United States, residing at California, in the county of Moniteau and State of Missouri, have invented a new and useful Incubator, of which the following is a specification.

My invention relates to improvements in incubators; and the objects of my improvements are, first, to provide an incubator wherein the eggs are heated by a drum from below; second, to provide an even distribution of heat in incubator; third, to provide an egg tray which will not allow the eggs to be ventilated from below.

In the drawings—

Figure 1:
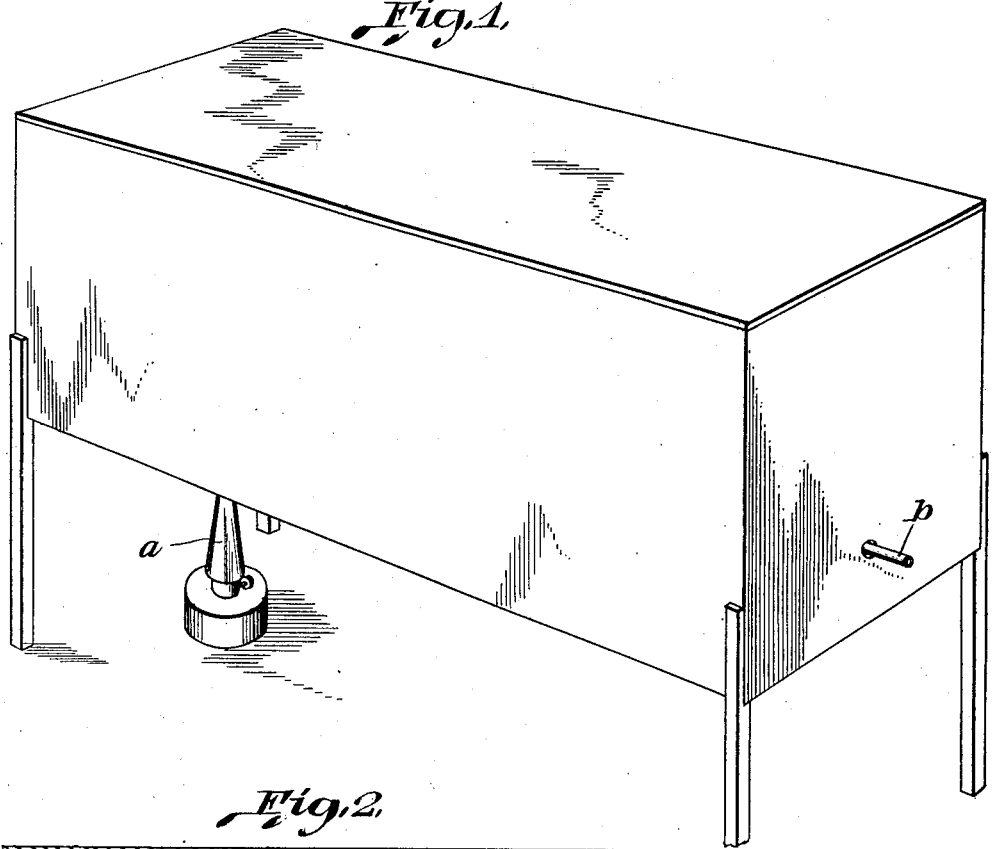
Figure 1 is a perspective view of the device.
Figure 2:
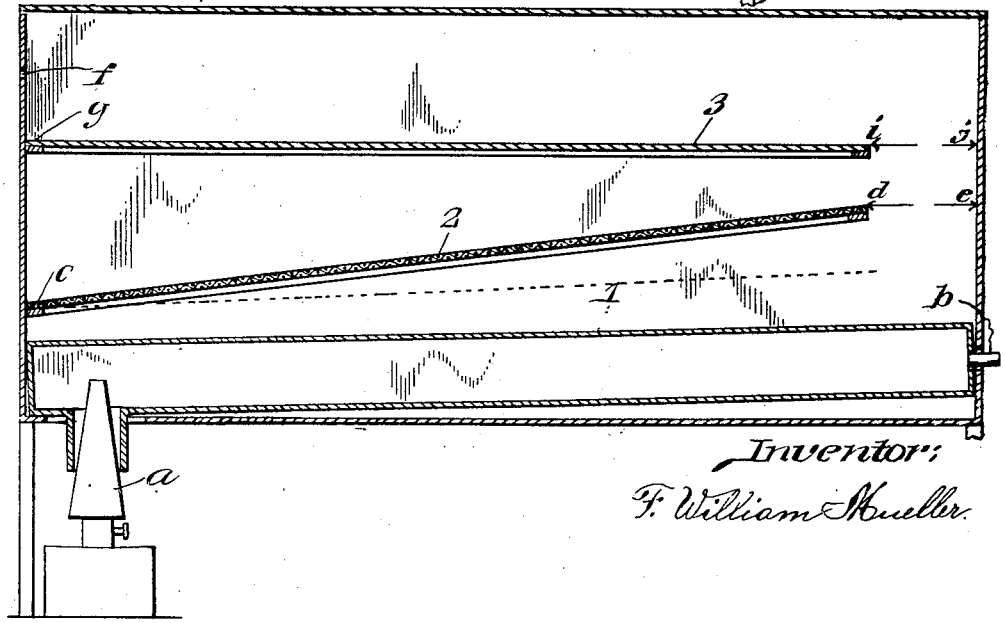
Fig. 2 is a vertical longitudinal sectional view.

I attain these objects by the devices shown in the accompanying drawing in which, 1 is a flat drum, placed slanting at the bottom of the inside of the incubator; 2 is the heat distributer made of frame covered with cloth, and placed slanting in the incubator; 3 is the egg tray, made of heavy card board and placed on a level in the incubator.

Heating system.

A flat drum is placed slanting at the bottom of the incubator so as to allow the heat gradually to rise till it escapes at the opening which consists of a small pipe in the middle of the end of the drum (marked $b$). It is heated by an oil lamp placed under the incubator at the lower end of the drum (marked $a$). A cup forms the opening of the drum ($a$) into which the chimney of the lamp is placed.

Heat distribution.

The heat distributer is a light weight frame covered with cloth. It is also placed slanting in the incubator being closest to the drum at point $c$. From $d$ to $e$ is an open space of about three inches. It allows heat to rise to the cover of the incubator passing over the eggs and making its escape through a small hole $f$ above the eggs, at the end of the incubator. The heat continually passes through the cloth, and while the distributer is slanting, the surplus heat floats from $c$ to $d$ and escapes through the opening $d$—$e$ into the upper part of the incubator. By lowering the distributer at point $d$, the heat is mainly held at point $c$. By so doing, the eggs at point $g$ would be overheated and at point $h$ they would be too cool. By raising the distributer at point $d$ to a certain height, the heat is allowed to float from $c$ to $d$, thus giving an even temperature in all parts of the tray.

Egg tray.

The egg tray is a substantial frame covered with a heavy cardboard or other equivalent material. The tray is placed on a level in the incubator. The board keeps the heat below the egg tray and therefore the eggs are heated from below. If therefore, a thermometer registers 105 on the tray, it will register 98 or 99 when placed on the eggs. An open space of about three inches $i$—$j$ allows the heat to the upper part of the incubator.

Ventilation.

An opening in the bottom of the incubator around the cup into which the chimney is placed, and around the pipe at point $b$ allows the cool and fresh air to enter the machine. It readily mixes with the warm air at the drum, and keeps the air on the inside of the incubator pure and sweet.

I am aware that prior to my invention, incubators were heated with hot air, but

I claim:—

1. In an incubator casing, a drum in the lower part therof, one end of drum being higher than the other, an outlet in one end of drum passing through wall of casing; a lamp so placed that the chimney opens into a cup built into the drum, air inlets around cup that chimney fits into in bottom of casing and around the drum outlet; a distributer made of cloth on a light frame spaced above the drum, contacting with the walls of casing on all sides except one, being spaced from wall of casing at one end and sloping from last named end down to other end, placed so that end of distributer can be raised or lowered; an egg tray spaced above the distributer and made of heavy cardboard or equivalent material, said tray being horizontal in casing and contacting with walls of casing on all sides except one, being spaced from casing wall at one end, said space being above space between end of distributer and casing wall; with hot air outlet in end of casing wall above egg tray in end opposite last mentioned end.

2. In an incubator casing, a drum in the lower part thereof, said drum being higher at one end than other, and there being a cup in bottom of drum passing through bottom of casing near end of incubator containing lower end of drum, air inlets at end of casing wall where drum outlet passes through casing wall and in bottom of casing around above mentioned cup, with a distributer that is adjustable so that the end can be either raised or lowered, said adjustable end being the end of distributer that is spaced from incubator wall, and said distributer being spaced above drum, with an egg tray spaced above distributer, said egg tray being spaced from casing wall directly above spaced end of distributer, and an air outlet in end of casing wall above egg tray, said end being opposite from last mentioned end of distributer.

F. WILLIAM MUELLER.